United States Patent
Kim et al.

(10) Patent No.: US 11,183,742 B2
(45) Date of Patent: Nov. 23, 2021

(54) CASING MATERIAL FOR SECONDARY BATTERY HAVING IMPROVED SAFETY AND SECONDARY BATTERY INCLUDING THE SAME

(71) Applicant: LG Chem, Ltd., Seoul (KR)

(72) Inventors: Dae-Soo Kim, Daejeon (KR); Min-Kyung Kim, Daejeon (KR)

(73) Assignee: LG Chem, Ltd.

( * ) Notice: Subject to any disclaimer, the term of this patent is extended or adjusted under 35 U.S.C. 154(b) by 310 days.

(21) Appl. No.: 16/329,618

(22) PCT Filed: Feb. 12, 2018

(86) PCT No.: PCT/KR2018/001838
§ 371 (c)(1),
(2) Date: Feb. 28, 2019

(87) PCT Pub. No.: WO2018/169217
PCT Pub. Date: Sep. 20, 2018

(65) Prior Publication Data
US 2019/0221785 A1    Jul. 18, 2019

(30) Foreign Application Priority Data
Mar. 13, 2017 (KR) .................. 10-2017-0031307

(51) Int. Cl.
*H01M 50/10* (2021.01)
*H01M 50/557* (2021.01)
(Continued)

(52) U.S. Cl.
CPC ....... *H01M 50/557* (2021.01); *H01M 10/052* (2013.01); *H01M 10/0525* (2013.01);
(Continued)

(58) Field of Classification Search
CPC .. H01M 50/10; H01M 50/116; H01M 50/121; H01M 50/124; H01M 50/1234;
(Continued)

(56) References Cited

U.S. PATENT DOCUMENTS 4,755,567 A    7/1988 Bierschenk et al.
7,776,465 B1   8/2010 Hatazawa et al.
(Continued)

FOREIGN PATENT DOCUMENTS

JP    S62252409 A    11/1987
JP    H11283671 A    10/1999
(Continued)

OTHER PUBLICATIONS

Search Report from International Application No. PCT/KR2018/001838, dated Jun. 5, 2018.
(Continued)

*Primary Examiner* — Stephen J Yanchuk
(74) *Attorney, Agent, or Firm* — Lerner, David, Littenberg, Krumholz & Mentlik, LLP (57) ABSTRACT

The present disclosure relates to a casing for a secondary battery shaped to receive an electrode assembly, and a secondary battery including the same. The casing for a secondary battery functions to scavenge hydrogen fluoride (HF) generated during the charging/discharging of a battery. In an embodiment, the casing for a secondary battery includes a casing material which is arranged such that an inner surface of the casing material defines has a receiving portion corresponding to the shape of an electrode assembly, and a polymer sheet disposed on the inner surface of the casing material, wherein the polymer sheet having a hydrogen fluoride (HF) scavenger contained therein or disposed on a surface thereof, and wherein the polymer sheet is capable of dissolving at pH 3 or less.

13 Claims, 4 Drawing Sheets

(51) Int. Cl.
  *H01M 10/0525* (2010.01)
  *H01M 10/52* (2006.01)
  *H01M 10/052* (2010.01)
  *H01M 50/116* (2021.01)
  *H01M 50/342* (2021.01)
  *H01M 50/131* (2021.01)

(52) U.S. Cl.
  CPC ......... *H01M 10/52* (2013.01); *H01M 50/116* (2021.01); *H01M 50/342* (2021.01); *H01M 50/131* (2021.01); *H01M 2200/00* (2013.01)

(58) Field of Classification Search
  CPC . H01M 10/052; H01M 10/52; H01M 10/0525
  See application file for complete search history.

(56) References Cited

U.S. PATENT DOCUMENTS

| | | | |
|---|---|---|---|
| 2003/0129487 A1* | 7/2003 | Inoue | H01M 50/116 429/176 |
| 2008/0206636 A1 | 8/2008 | Sanada et al. | |
| 2008/0274328 A1 | 11/2008 | Gkinosatis | |
| 2013/0337304 A1 | 12/2013 | Luski et al. | |
| 2014/0186687 A1 | 7/2014 | Obasih et al. | |
| 2015/0147632 A1* | 5/2015 | Wang | H01M 10/052 429/163 |
| 2017/0092902 A1* | 3/2017 | Ueda | H01M 10/4221 |

FOREIGN PATENT DOCUMENTS

| | | |
|---|---|---|
| JP | 2003123836 A | 4/2003 |
| JP | 2005056672 A | 3/2005 |
| JP | 2008235255 A | 10/2008 |
| JP | 2008235256 A | 10/2008 |
| JP | 2014507053 A | 3/2014 |
| JP | 2016096108 A | 5/2016 |
| KR | 20010052006 A | 6/2001 |
| KR | 20010068650 A | 7/2001 |
| KR | 20080112653 A | 12/2008 |
| KR | 101539829 B1 | 7/2015 |
| KR | 20160037473 A | 4/2016 |

OTHER PUBLICATIONS

Supplemental European Search Report for EP18768437.8 dated Sep. 23, 2019.

* cited by examiner

CASING MATERIAL FOR SECONDARY BATTERY HAVING IMPROVED SAFETY AND SECONDARY BATTERY INCLUDING THE SAME

CROSS-REFERENCE TO RELATED APPLICATION(S)

The present application is a national phase entry under 35 U.S.C. § 371 of International Application No. PCT/KR2018/001838, filed on Feb. 12, 2018, which claims priority to Korean Patent Application No. 10-2017-0031307 filed on Mar. 13, 2017, the disclosures of which are incorporated herein by reference.

TECHNICAL FIELD

The present disclosure relates to a casing for a secondary battery in which an electrode assembly is received, and a secondary battery including the same. More particularly, the present disclosure relates to a casing for a secondary battery which has a function of scavenging hydrogen fluoride (HF) generated during the charging/discharging of a battery, and a secondary battery including the same.

BACKGROUND ART

Secondary batteries are classified into cylindrical batteries and prismatic batteries including an electrode assembly received in a cylindrical or prismatic metallic can and pouch type batteries including an electrode assembly received in a pouch type casing of an aluminum laminate sheet, depending on the shape or material of a casing material receiving an electrode assembly.

Meanwhile, in general, a small amount of moisture may be incorporated into a battery during the manufacturing process of the battery. Particularly, in the case of a pouch type casing, there is a high possibility of moisture infiltration through a sealing portion, or the like. When moisture is present in the battery due to various causes, reaction products, such as HF, are produced through reactions with battery ingredients. Such HF breaks a solid electrolyte interphase (SEI) layer and causes dissolution of a positive electrode, which occurs severely at high temperature so that a severe problem may occur in terms of the safety of a battery.

According to the related art, a method for incorporating a predetermined HF-scavenger into a battery is disclosed. For example, Japanese Patent Laid-Open No. 1999-283671 discloses a secondary battery containing $LiF_6$, wherein $Mg_x$-$Al_yO_z$ (x≥0, y≥0, x+y=1, z>0) is added to a positive electrode mixture. Korean Patent Laid-Open No. 2001-0068650 discloses a lithium secondary battery, which includes an inorganic base capable of capturing HF gas derived from a fluorine-containing compound in at least one of an electrode, separator and an electrolyte.

However, the above disclosures merely consist in incorporation of a predetermined inorganic material to an electrode, separator and electrolyte in the form of an additive. Thus, when such inorganic additives are present in the portion directly affecting the function of a battery in a large amount, lithium ion mobility is reduced significantly and thus conductivity is decreased, resulting in degradation of the performance of the battery and generation of various side reactions in the battery. Therefore, the above-mentioned problem still remains unsolved.

DISCLOSURE

Technical Problem

The present disclosure is designed to solve the problems of the related art, and therefore the present disclosure is directed to providing a casing for a secondary battery which includes a polymer sheet disposed on an inner surface of the casing, wherein the polymer sheet include a hydrogen fluoride (HF) scavenger contained therein or disposed on a surface thereof. The present disclosure is also directed to providing a secondary battery including the casing for a secondary battery. It will be easily understood that the other objects and advantages of the present disclosure may be realized by the means shown in the appended claims and combinations thereof.

Technical Solution

In one aspect of the present disclosure, there is provided a casing for a secondary battery which can solve the problems of the related art.

According to a first embodiment of the present disclosure, there is provided a casing which has a casing material arranged such that an inner surface of the casing material defines a receiving portion corresponding to the shape of an electrode assembly, and includes a polymer sheet disposed on the inner surface of the casing material, wherein the polymer sheet includes a hydrogen fluoride (HF) scavenger contained therein or disposed on a surface thereof, and wherein the polymer sheet is capable of dissolving at pH of 3 or less.

According to a second embodiment of the present disclosure, there is provided the casing of the first embodiment, wherein the polymer sheet includes a polymer containing at least one of the repeating units represented by Chemical Formula 1, Chemical Formula 2 or Chemical Formula 3:

[Chemical Formula 1]

[Chemical Formula 2]

[Chemical Formula 3]

In Chemical Formula 1 and Chemical Formula 2, each X is, independently, a single bond, a sulfone group, ether group, thioether group or a C1-C5 alkyl group.

In Chemical Formula 2, Y is represents single bond, a sulfone group, ether group, thioether group or a C1-C5 alkyl group.

According to a third embodiment of the present disclosure, there is provided the polymer sheet as defined in the first or the second embodiment, wherein the HF scavenger is contained in the polymer sheet.

According to a fourth embodiment of the present disclosure, there is provided the casing as defined in any one of the first to the third embodiments, wherein the HF scavenger is coated on one surface of the polymer sheet.

According to a fifth embodiment of the present disclosure, there is provided the casing as defined in any one of the first to the fourth embodiments, wherein the one surface of the polymer sheet faces the inner surface of the casing material.

According to a sixth embodiment of the present disclosure, there is provided the casing as defined in any one of the first to the fifth embodiments, wherein the HF scavenger is at least one selected from the group consisting of lithium cobalt oxide, lithium carbonate ($Li_2CO_3$), sodium carbonate, calcium hydroxide, activated carbon, diatomaceous earth, perlite and zeolite.

According to a seventh embodiment of the present disclosure, there is provided the casing as defined in any one of the first to the sixth embodiments, wherein the HF scavenger is present in an amount of 0.01-50 wt % based on the total weight of the polymer sheet.

According to an eighth embodiment of the present disclosure, there is provided the casing as defined in any one of the first to the seventh embodiments, wherein the polymer sheet further includes a binding assistant to increase the binding force of the HF scavenger to the polymer sheet.

According to a ninth embodiment of the present disclosure, there is provided the casing as defined in any one of the first to the eighth embodiments, wherein the polymer sheet is coupled to the inner surface of the casing material by a non-reactive adhesive or fused to the inner surface of the casing material.

According to a tenth embodiment of the present disclosure, there is provided the casing as defined in any one of the first to the ninth embodiments, wherein the non-reactive adhesive is a silicone polymer adhesive or a carbon optical fiber polymer adhesive.

According to an eleventh embodiment of the present disclosure, there is provided the casing as defined in any one of the first to the tenth embodiments, wherein the casing material includes a laminate sheet, wherein the laminated sheet having, in order, an outer coating layer of a polymer film, a barrier layer of metal foil, and an inner sealant layer of polyolefin, and wherein the inner sealant layer faces the receiving portion.

According to a twelfth embodiment of the present disclosure, there is provided the casing as defined in any one of the first to the eleventh embodiments, wherein the polymer sheet is disposed on a surface of the inner sealant layer.

According to a thirteenth embodiment of the present disclosure, there is provided a secondary battery including the casing as defined in any one of the first to the twelfth embodiments.

According to a fourteenth embodiment of the present disclosure, there is provided the secondary battery as defined in the thirteenth embodiment, which is a pouch type battery including an electrode assembly disposed in the receiving portion.

According to a fifteenth embodiment of the present disclosure, there is provided a secondary battery including: an electrode assembly including a positive electrode, a negative electrode and a separator interposed between the positive electrode and the negative electrode; an electrolyte containing a lithium salt and an organic solvent; and the casing as defined in any one of the first to the twelfth embodiments, wherein the electrode assembly and electrolyte are disposed in the receiving portion.

Advantageous Effects

The casing for a secondary battery according to the present disclosure allows the polymer sheet to be dissolved under the specific condition where generation of HF is increased and pH of the electrolyte reaches a predetermined level. Thus, when the HF scavenger is dissolved out to the electrolyte, generation of the initial side reaction caused by additives is minimized so that HF may be removed effectively while not adversely affecting the performance of the battery. As a result, it is possible to realize excellent battery performance. In other words, the HF scavenger adsorbs HF present in the battery itself to prevent undesired side reactions, such as decomposition of an electrode active material or electrolyte. Therefore, it is possible to prevent degradation of the performance and life characteristics of the battery, and to prevent deterioration of the battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The casing for a secondary battery according to the present disclosure has a casing material arranged such that an inner surface of the casing material defines a receiving portion corresponding to the shape of an electrode assembly, and includes polymer sheet disposed on the inner surface of the casing material, wherein the polymer sheet includes a hydrogen fluoride (HF) scavenger contained therein or disposed on a surface thereof, and wherein the polymer sheet is capable of dissolving at pH 3 or less.

According to the present disclosure, the inner surface means the surface defining the receiving portion formed by the casing material which is not exposed to the exterior, after sealing the casing material, but incorporated into the battery, among the surfaces of the casing material.

The polymer sheet is formed at least partially on the inner surface of the casing material. According to an embodiment, the polymer sheet is attached chemically or physically to the inner surface of the casing material. According to an embodiment of the present disclosure, the polymer sheet is capable of dissolving at pH of about 3. According to the present disclosure, such dissolution of the polymer sheet means weakening of ionic bonding, hydrogen bonding, dipole-dipole bonding and Van der Waals bonding formed between the polymer chains forming the polymer sheet and partial or total separation of the polymer chains.

According to an embodiment of the present disclosure, the polymer sheet includes a polymer containing at least one of the repeating units represented by Chemical Formula 1, Chemical Formula 2 or Chemical Formula 3:

[Chemical Formula 1]

[Chemical Formula 2]

[Chemical Formula 3]

In Chemical Formula 1 and Chemical Formula 2, each X is, independently, a single bond, a sulfone group, ether group, thioether group or a C1-C5 alkyl group.

In Chemical Formula 2, Y is represents single bond, a sulfone group, ether group, thioether group or a C1-C5 alkyl group.

According to an embodiment of the present disclosure, the alkyl group in each of X and Y independently represents (propylene).

A typical example of the polymer having any one repeating unit selected from Chemical Formula 1 to Chemical Formula 3 is polybenzimidazole and particular examples thereof may include poly[2,2'-(m-phenylene)-5,5'-bibenzimidazole] (PBI) and poly[2,5-benzimidazole] (ABPBI).

The polybenzimidazole-based polymer includes an aromatic ring and has π-π interaction in a planar structure. In addition, the polymer shows significantly high interaction between polymer chains under the effect of hydrogen bonding derived from the N—H structure in the polymer chains, and has strong resistance against an electrolyte.

In the polybenzimidazole-based polymer, the polymer chains are deflocculated by the electric repulsion between the chains, when $H^+$ ions are coordinated around the nitrogen atom (N) and the polymer chains are positively charged under a strong acidic condition, resulting in dissolution of the polymer sheet.

According to an embodiment of the present disclosure, the polymer sheet may include a HF scavenger contained therein. According to another embodiment of the present disclosure, the polymer sheet may be coated with a HF scavenger on one surface thereof. The following methods for supporting a HF scavenger in the polymer or for coating a HF scavenger on the surface of the polymer sheet may be used, but the present disclosure is not limited thereto.

First, powder of a polybenzimidazole-based polymer is dissolved into a mixture of LiCl with DMAc at high temperature under high pressure to obtain a homogeneous solution. In a variant, powder of a polybenzimidazole-based polymer is refluxed in a mixture of NaOH with ethanol to obtain a solution, wherein NaOH is maintained at a concentration of about 3%. Once a polybenzimidazole-based polymer solution is obtained in the above-mentioned manner, the solution is applied to a substrate, such as glass or Teflon, and an excessive amount of solvent is removed to obtain a polymer sheet.

In the above-described method for preparing a polymer sheet, a HF scavenger is introduced to the polymer solution and the solvent is dried to obtain a polymer in which the HF scavenger is supported. Otherwise, the HF scavenger may be supported in the polymer sheet by dipping the polymer sheet in a solution in which the HF scavenger is dispersed.

Meanwhile, various methods, such as flow coating, spin coating, dip coating and bar coating, may be used to coat the surface of the polymer sheet with the HF scavenger, and the HF scavenger may be vaporized so that it may be deposited on the surface of the polymer sheet.

The polymer sheet may be attached to the corresponding portion of the casing material during the assemblage of a secondary battery. In this case, a non-reactive adhesive that does not affect the operation of the battery may be used to attach the polymer sheet, or hot fusion may be carried out to attach the polymer sheet.

The polymer sheet is attached to at least a part of the inner surface of the casing material, then a receiving portion having a shape corresponding to the shape of an electrode assembly may be formed, or alternatively, the polymer sheet may be attached to the inner surface of the casing material after a receiving portion is formed.

The non-reactive adhesive means an adhesive causing no side reaction with an electrolyte or electrode active material, and particular examples thereof include a silicone polymer adhesive or carbon optical fiber polymer adhesive.

The polymer sheet may have a thickness which can be determined adequately considering the volume of the receiving portion in the battery casing and the size of the electrode assembly. However, when the polymer sheet has an excessively small thickness, it is difficult to realize a desired impact-absorbing effect. On the contrary, when the polymer sheet has an excessively large thickness, the battery capacity is decreased relatively. Considering this, the polymer sheet preferably has a thickness of 1 µm-1 mm preferably, and more preferably of 10 µm-0.5 mm.

As described above, the polymer sheet according to the present disclosure includes a HF scavenger. Therefore, it is possible to solve many problems occurring when HF is present in a battery. Hereinafter, this will be explained in more detail.

For example, when an electrolyte contains $LiPF_6$ as a lithium salt, $LiPF_6$ should be present in an ionic form of $Li^+$ and $PF_6^-$. However, side reaction occurs undesirably, and thus unstable $PF_5$ is produced as a byproduct. $PF_5$ reacts with $H_2O$ present in a small amount in the electrolyte to form HF. HF breaks a solid electrolyte interphase (SEI) layer and causes dissolution of a positive electrode, which occur severely at high temperature. Particularly, HF causes decomposition of the ingredients of an organic solvent to generate a large amount of gas, and thus causes an increase in internal pressure of the battery and explosion of the battery. Depending on the type of a lithium salt used as an electrolyte, other materials, such as HCl, HBr and HI, are produced, besides HF. Thus, there is a problem in that the materials may function like HF as acid.

As a method for solving the above-mentioned problem, a method for adding a HF scavenger directly into the battery may be considered. However, as mentioned above, when adding the additive directly to the electrolyte or electrode assembly, lithium ion mobility may be degraded, the battery capacity may be decreased relatively, and various side reactions may occur due to direct contact with an electrode material.

On the contrary, when the polymer sheet is dissolved and the HF scavenger is dissolved out to the electrolyte under such a condition that generation of HF is increased and pH of the electrolyte reaches a predetermined level, it is possible to minimize generation of initial side reactions caused by the additive and to remove HF effectively without degradation of the battery performance Thus, it is possible to realize excellent battery performance. In other words, since the HF scavenger adsorbs HF present in the battery itself to prevent undesired side reactions, such as decomposition of the electrode active material or electrolyte, it is possible to prevent degradation of the performance and life characteristics of the battery and deterioration of the battery.

The HF scavenger is a material which does not react with the electrolyte and electrode active material and causes no degradation of the battery performance Any known HF scavenger may be used as long as it can adsorb HF preferentially. For example, the HF scavenger may be a material having high chemical binding force or affinity with HF molecules as compared to the electrolyte with HF molecules, and preferred examples thereof include, but are not limited to: at least one selected from the group consisting of $Li_2CO_3$, potassium carbonate, lithium carbonate, sodium carbonate, activated carbon, calcium hydroxide, diatomaceous earth, perlite and zeolite.

The HF scavenger may be present in the polymer sheet in an amount of 0.01-50 wt % based on the total weight of the polymer sheet. When the HF scavenger is present in an excessively small amount, it is not possible to obtain a desired degree of HF-absorbing effect. On the other hand, when the HF scavenger is present in an excessively large amount, the amount of HF which cannot be bound to the polymer sheet but is dissolved out to the electrolyte is increased, thereby causing the same problem in the case of adding the HF scavenger directly to the electrolyte. This is also undesirable in terms of battery capacity and weight lightening.

During the coating process, a predetermined binding assistant may be added in order to increase the binding force of the HF scavenger to the polymer sheet. There is no particular limitation in the binding assistant, as long as it causes no chemical reaction in the battery. Particular examples of the binding assistant include fluoropolymers, such as PVdF and PTFE, PVdF-based copolymers, PMMA, PAN, PEO, SBR, or the like.

Optionally, a moisture scavenger may be further incorporated to the polymer sheet. Otherwise, a moisture scavenger may be incorporated to a part of the polymer sheet or to a separate polymer sheet, instead of the HF scavenger. For example, a polymer sheet including the HF scavenger and the moisture scavenger at the same time may be attached to the inner surface of the battery casing. Otherwise, a polymer sheet containing the HF scavenger may be added to one surface of the battery casing and another polymer sheet containing the moisture scavenger may be added to the other surface of the battery casing. Therefore, it is possible to remove acids, such as HF, and to fundamentally prevent generation of such acids.

The moisture scavenger is a material which does not react with the electrolyte and electrode active material and causes no degradation of the battery performance. Preferred examples of the moisture scavenger include, but are not limited to: at least one selected from the group consisting of activated carbon, zeolite, alumina, silica gel, molecular sieves, magnesia (MgO) and titanium dioxide ($TiO_2$).

Figure 7:
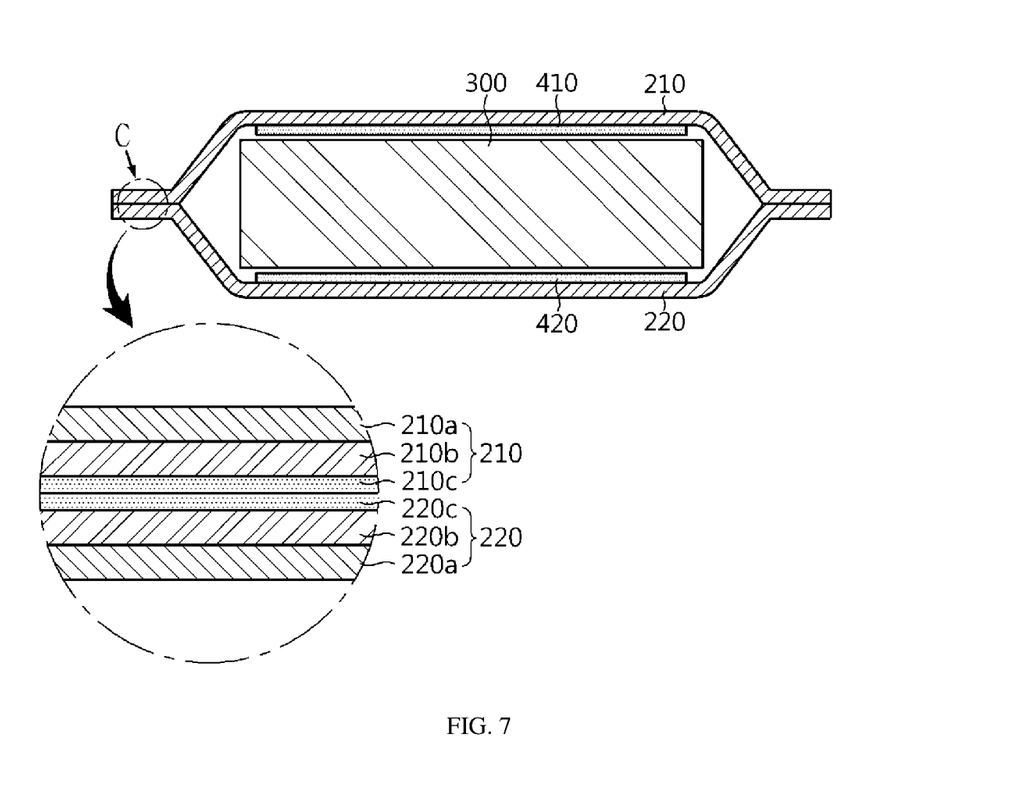
FIG. 7 is a sectional view taken along A-A' of FIG. 2, and further illustrates the casing material in accordance with an embodiment of the present disclosure.

The casing material may include a laminate sheet having an outer coating layer (210a, 220a) of a polymer film, a barrier layer (210b, 220c) of metal foil, and an inner sealant layer (210c, 220c) of polyolefin as depicted in FIG. 7 for the upper casing 210 and the lower casing 220, respectively. The outer coating layer should have excellent resistance against external environment, and thus is required to have a predetermine degree of tensile strength and weathering resistance. In this context, an oriented nylon film or polyethylene terephthalate (PET) may be used preferably as a polymer resin for the outer resin layer. The barrier layer may include aluminum preferably so that it may realize a function of preventing introduction and leakage of foreign materials, such as gas and moisture, as well as a function of improving the strength of the battery casing. The inner sealant layer preferably includes a polyolefin resin which has hot fusion property (hot adhesive property), shows low hygroscopic property to inhibit infiltration of the electrolyte and causes no swelling or erosion caused by the electrolyte, and more preferably includes casted polypropylene (cPP).

The receiving portion may be formed to have a size corresponding to the electrode assembly at one side of the battery casing material or may be formed at both sides of the battery casing material.

In another aspect, there is provided a secondary battery including the casing material for a secondary battery.

According to an embodiment, the secondary battery may be a pouch type secondary battery including an electrode assembly received in a laminate sheet having a metallic layer and a resin layer, particularly in a pouch type casing of an aluminum laminate sheet. However, the present disclosure is not limited thereto. In a variant, the secondary battery may be a cylindrical or prismatic secondary battery including an electrode assembly received in a cylindrical or prismatic metallic can.

According to the present disclosure, the secondary battery has a structure in which an electrode assembly including a positive electrode, a negative electrode and a separator interposed between the positive electrode and the negative electrode, and an electrolyte incorporated thereto.

According to an embodiment of the present disclosure, the positive electrode may be obtained by applying a positive electrode active material onto a positive electrode current collector, followed by drying. The positive electrode may further include a binder and a conductive material optionally with the ingredients described above with reference to the constitution of the positive electrode.

The positive electrode current collector generally has a thickness of 3-500 μm. The positive electrode current collector is not particularly limited, as long as it has high conductivity while not causing any chemical change in the battery. The positive electrode current collector that may be used includes stainless steel, aluminum, nickel, titanium, baked carbon, aluminum or stainless steel surface-treated with carbon, nickel, titanium, silver, etc., aluminum-cadmium alloy, or the like. In addition, the positive electrode current collector may have fine surface irregularities formed on the surface thereof to increase the adhesion of the positive electrode active material, and may be provided in various shapes, including a film, sheet, foil, net, porous body, non-woven web body, or the like.

The positive electrode active material may include, but is not limited to: a layered compound such as lithium cobalt oxide ($LiCoO_2$) or lithium nickel oxide ($LiNiO_2$), or a compound substituted with one or more transition metals; lithium manganese oxide such as $Li_{1-x}Mn_{2-x}O_4$ (wherein x is 0-0.33), $LiMnO_3$, $LiMn_2O_3$ or $LiMnO_2$; lithium copper oxide ($Li_2CuO_2$); vanadium oxide, such as $LiV_3O_8$, $LiFe_3O_4$, $V_2O_5$, $Cu_2V_2O_7$, or the like; Ni-site type lithium nickel oxide represented by the chemical formula of $LiNi_{1-x}M_xO_2$ (wherein M=Co, Mn, Al, Cu, Fe, Mg, B or Ga, and x=0.01-0.3); lithium manganese composite oxide represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which a part of Li is substituted with alkaline earth metal ions; disulfide compound; $Fe_2(MoO_4)_3$, or the like.

The negative electrode is obtained by applying a negative electrode material including a negative electrode active material and a binder, followed by drying and compression. If desired, other ingredients, such as a conductive material and filler, may be further used.

For example, the negative electrode active material may include: carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me:Mn, Fe, Pb, Ge; Me':Al, B, P, Si, elements of Group 1, 2 or 3, halogen; $0 < x \leq 1$; $1 \leq y \leq 3$; $1 \leq z \leq 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; or the like.

The separator is interposed between the positive electrode and the negative electrode, and an insulating thin film having high ion permeability and mechanical strength is used as separator. The separator may have a pore diameter generally of 0.01-10 μm and a thickness of 5-300 μm. Particular examples of the separator include: olefin polymers, such as chemically resistant and hydrophobic polypropylene; sheets or non-woven webs made of glass fibers or polyethylene; or the like. Optionally, an inorganic coating layer containing inorganic particles may be further formed on the outermost surface of the separator in order to increase heat stability.

The lithium salt-containing non-aqueous electrolyte may include an organic solvent electrolyte and a lithium salt, and particular examples of the electrolyte may include aprotic organic solvents, such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimetnoxyethane, 1,2-diethoxyethane, tetrahydroxy franc, 2-methyl tetrahydrofuran, dimethyl sulfoxide, 1,3-dioxolane, 4-methyl-1,3-dioxane, diethyl ether, formamide, dimethyl formamide, dioxolane, acetonitrile, nitromethane, methyl formate, methyl acetate, triphosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

The lithium salt is a material easily soluble in the non-aqueous electrolyte, and particular examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carboxylate, lithium tetraphenylborate, imide, or the like.

In addition, in order to improve charging/discharging characteristics, flame resistance, or the like, it is possible to add pyridine, triethyl phosphite, triethanol amine, cyclic ether, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, aluminum trichloride, or the like, to the electrolyte. Optionally, in order to impart incombustibility, a halogen-containing solvent, such as carbon tetrachloride or ethylene trifluoride, may be further added. In order to improve high-temperature storage characteristics, carbon dioxide gas may be further added.

Other elements used currently in the field of secondary batteries may be used in addition to the above-described battery elements.

Herein, the present disclosure will be explained in detail with reference to the accompanying drawings but the scope of the present disclosure is not limited thereto.

Figure 1:
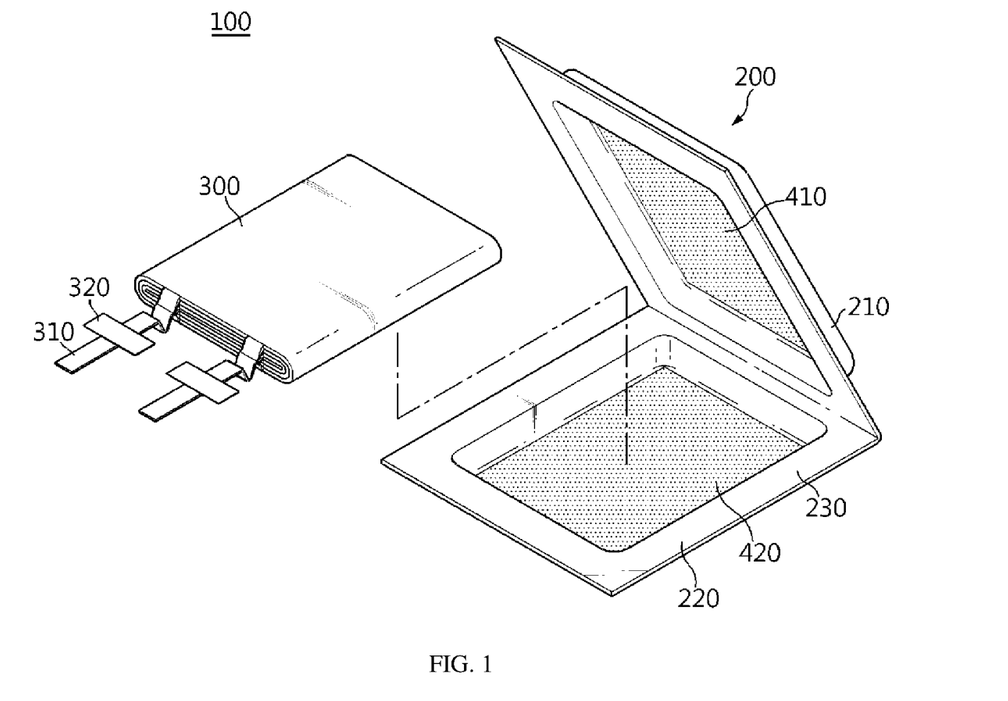
FIG. 1 is an exploded perspective view illustrating the secondary battery including the casing material for a secondary battery according to the present disclosure.

FIG. 1 is an exploded perspective view illustrating the secondary battery including the casing for a secondary battery according to the present disclosure. Referring to FIG. 1, the pouch type secondary battery 100 includes an electrode assembly 300, an electrode lead 310 welded to the electrode tab extended from the electrode assembly 300, a battery casing 200 having a receiving portion configured to receive the electrode assembly 300, and polymer sheet 410, 420 containing a HF-adsorbing agent.

The electrode assembly 300 is a power generation device including positive electrodes and negative electrodes with separators interposed therebetween, successively, and it has a folded, stack or stack/folded structure. Each electrode tab is extended from each electrode plate of the electrode assembly 300, and the electrode lead 310 is connected electrically with a plurality of electrode tabs extended from each electrode plate, for example, by welding. In addition, an insulating film 320 attached to a part of the top surface and bottom surface of the electrode lead 310 in order to increase the sealability with the battery casing 200 while ensuring an electrically insulated state.

The battery casing 200 includes an upper casing 210 and a lower casing 220. Each of the upper casing 210 and the lower casing 220 has a receiving portion configured to receive the electrode assembly 300. The battery casing has a pouch-like overall shape. A polymer sheet 410 is attached to the top end of the inner surface of the receiving portion in the upper casing 210, and another polymer sheet 420 is attached to the bottom end of the inner surface of the receiving portion in the lower casing 220.

In the drawing, it is shown that the polymer sheets 410, 420 containing a HF-adsorbing agent have substantially the same shape as the shapes of the top surface and the bottom surface of the electrode assembly 300. However, the present disclosure is not limited thereto but various shapes of polymer sheets may be added to the inner surfaces of the battery casing 200. Since each polymer sheet 410, 420 includes a HF-adsorbing agent supported therein or coated thereon, it adsorbs HF present in the battery to prevent fracture of a solid electrolyte interphase (SEI) film and decomposition of an electrolyte, thereby providing excellent high-temperature safety.

Optionally, each polymer sheet 410, 420 may include a moisture-adsorbing agent in addition to the HF-adsorbing agent. Otherwise, one polymer sheet 410 may include a HF-adsorbing agent and the other polymer sheet 420 may include a moisture-adsorbing agent. Further, each polymer sheet 410, 420 may include a HF-adsorbing agent over the whole area thereof and may locally include a moisture-adsorbing agent.

The secondary battery 100 may be obtained by adding one polymer sheet 420 to the inner surface of the lower casing 220, mounting the electrode assembly 300 thereto, adding the other polymer sheet 410 to the top surface thereof, mounting the upper casing 210 thereto, and carrying out hot fusion of the outer circumferential surface 230.

Figure 2:
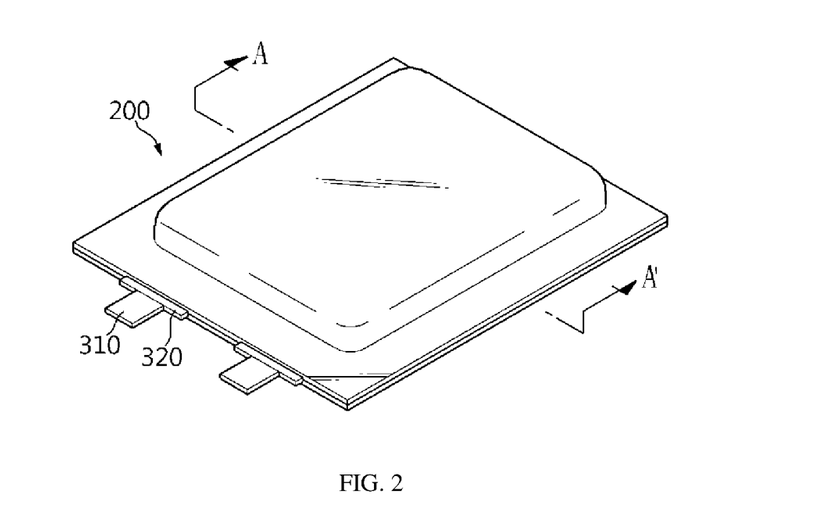
FIG. 2 shows the pouch type secondary battery according to an embodiment of the present disclosure.
Figure 3:
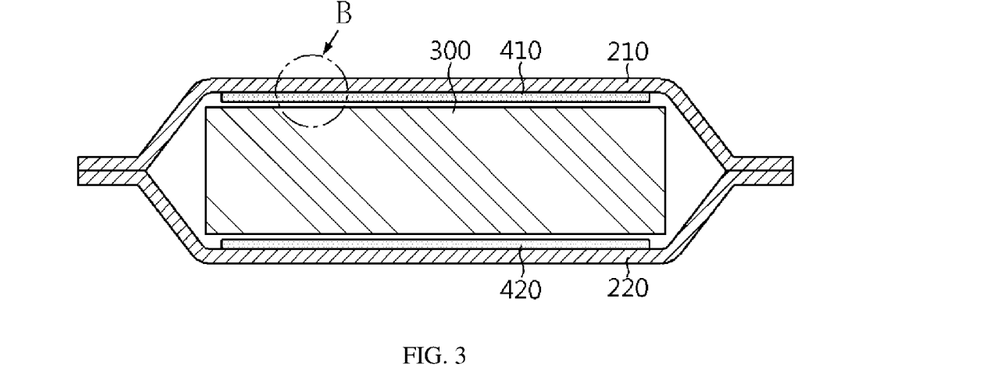
FIG. 3 is a sectional view taken along A-A' of FIG. 2.

FIG. 2 shows the pouch type secondary battery according to an embodiment of the present disclosure, and FIG. 3 is a sectional view taken along A-A' of FIG. 2. Referring to FIG. 3, the polymer sheets 410, 420 are attached to the inner surfaces of the battery casing by using a non-reactive adhesive, or the like. The position where each polymer sheet 410, 420 is attached may be a part or the whole of the inner surfaces of the battery casing 200. As shown in FIG. 3, the polymer sheets may be attached to the top end and bottom end of the inner side of the receiving portions of the electrode assembly.

Figure 4:
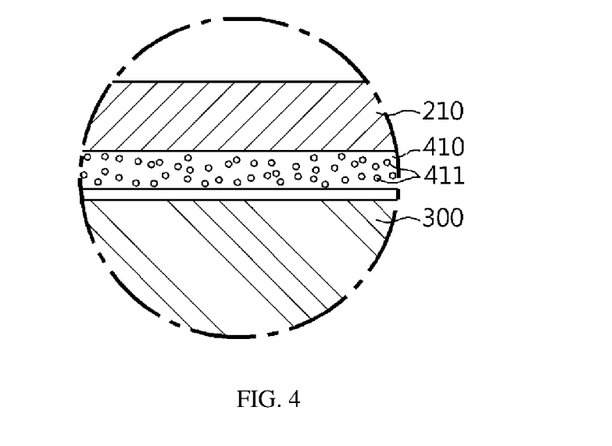
FIG. 4 is a schematic view illustrating an embodiment of a casing for a secondary battery including a polymer sheet impregnated with a HF scavenger.
Figure 5A:
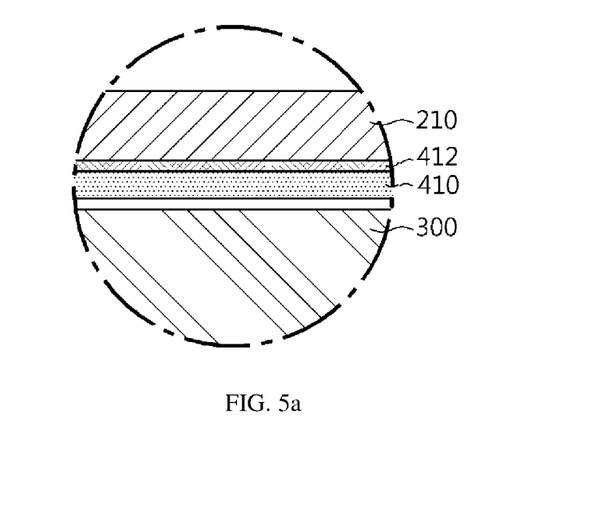
FIG. 5a and FIG. 5b are schematic views illustrating an embodiment of a casing for a secondary battery including a polymer sheet coated with a HF scavenger.
Figure 5B:
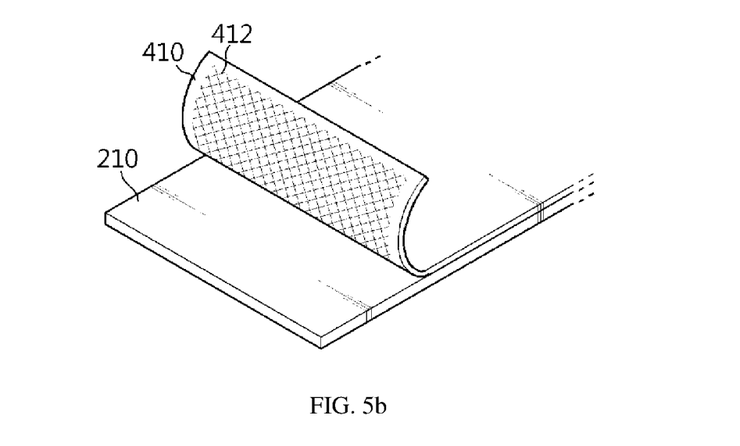

According to an embodiment of the present disclosure, the polymer sheet may be impregnated with the HF scavenger or coated with the HF scavenger on one surface thereof. FIG. 4 is a schematic view illustrating a polymer sheet impregnated with a HF scavenger, and FIG. 5a is a schematic view illustrating a polymer sheet including a HF scavenger (illustrated as a layer 412) coated on one surface thereof. In addition, FIG. 5b is an exploded perspective view illustrating the coated surface provided on one side of the polymer sheet. Referring to FIG. 5a and FIG. 5b, the surface coated with the HF scavenger in the polymer sheet is not exposed to the exterior and is attached to the inner surface of the battery casing through coating on the polymer sheet. In other words, the surface coated with the HF scavenger is covered totally with the polymer sheet so that the HF scavenger may not be dissolved out to the electrolyte before the electrolyte reaches a predetermined level of pH.

Figure 6:
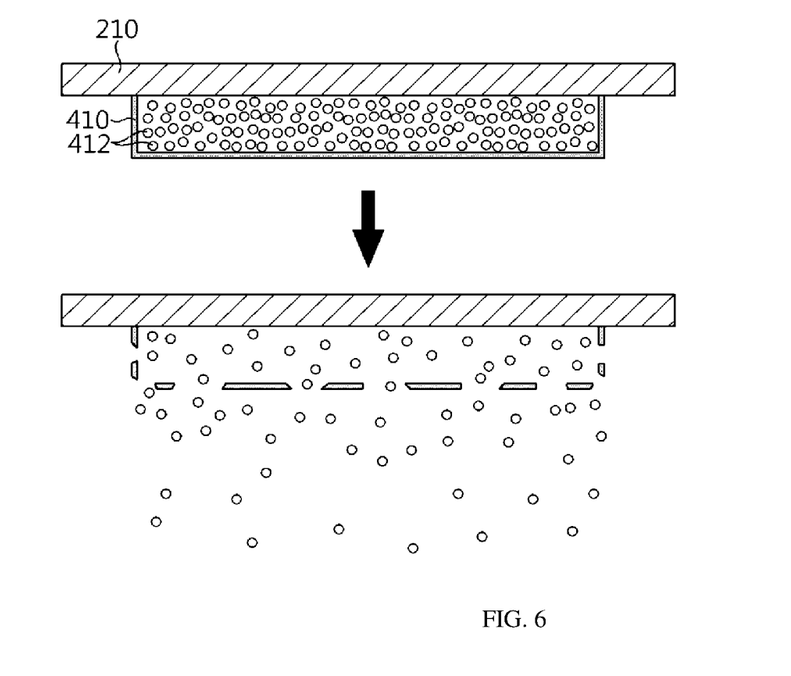
FIG. 6 is a schematic view illustrating diffusion of a scavenger coated on a polymer sheet into an electrolyte upon the dissolution of the polymer sheet.

FIG. 6 is a schematic view illustrating diffusion of a scavenger coated on a polymer sheet into the polymer sheet upon the dissolution of the polymer sheet. During the charging/discharging of the battery, generation of HF is increased to cause an increase in concentration of $H^+$ in the electrolyte. When pH of the electrolyte is decreased to 3 or less, the polymer sheets starts to be dissolved. Thus, HF is removed while the HF scavenger is dissolved out to the electrolyte.

EXAMPLE

1. Preparation of Pouch Casing

A pouch casing for a battery having an electrode assembly-receiving portion and a sealing portion and including a laminate film of aluminum metal foil and casted polypropylene was prepared. A polymer sheet containing a HF scavenger was coated onto the inner surface of the electrode assembly-receiving portion. The prepared pouch casing had the shape as shown in FIG. 1.

The polymer sheet was coated as follows. First, powder of a polybenzimidazole-based polymer is refluxed in a mixture of NaOH-ethanol containing 3% NaOH to obtain a polymer solution. The polymer may be represented by the following Chemical Formula 4. The polymer solution was used after it was mixed with $Al_2O_3$ and $Li_2CO_3$ at a weight ratio of 1:1. $Al_2O_3$ and $Li_2CO_3$ were introduced in an amount of 10 wt % based on the total weight of the polymer sheet. The resultant mixture was applied to a substrate made of Teflon and dried to obtain a polymer sheet having a thickness of about 60 μm. The polymer sheet was fixed to the inner surface of the pouch casing material by using a Kapton double-sided tape.

[Chemical Formula 4]

2. Manufacture of Electrode Assembly

First, 92 parts by weight of spinel type lithium manganese oxide ($LiMn_2O_4$), 4 parts by weight of carbon black and 4 parts by weight of PVdF were added to N-methyl-2-pyrrolidone (NMP) to obtain positive electrode slurry. The positive electrode slurry was applied to a positive electrode current collector of aluminum (Al) foil having a thickness of 20 μm and dried, and then roll pressing was carried out to obtain a positive electrode.

Then, 92 parts by weight of graphite, 4 parts by weight of carbon black and 4 parts by weight of a mixed binder of carboxymethyl cellulose (CMC) and styrene butadiene rubber (SBR) (CMC:SBR=1:1, weight ratio) were added to water to obtain negative electrode slurry. The negative electrode slurry was applied to a negative electrode current collector of copper (Cu) foil having a thickness of 20 μm and dried, and then roll pressing was carried out to obtain a negative electrode.

A polypropylene film separator was interposed between the negative electrode and the positive electrode and winding was carried out to obtain a jelly roll-type electrode assembly.

3. Manufacture of Battery

An electrolyte was prepared by introducing 1M $LiPF_6$ to an organic solvent containing a mixture of ethylene carbonate and ethyl methyl carbonate at a ratio of 3:7. The electrode assembly obtained from part 2 was received in the pouch casing obtained from part 1, and the sealing portion through which the electrolyte was injected was sealed to obtain a battery.

Comparative Example 1

1. Preparation of Pouch Casing

The pouch casing was prepared in the same manner as example, except for the polymer sheet which was prepared as described below.

PVdF-HFP was introduced to acetone and mixed therewith to obtain a polymer solution. The polymer solution was used after it was mixed with $Al_2O_3$ and $Li_2CO_3$ at a weight ratio of 1:1. $Al_2O_3$ and $Li_2CO_3$ were introduced in an amount of 10 wt % based on the total weight of the polymer sheet. The resultant mixture was applied to a substrate made of Teflon and dried to obtain a polymer sheet having a thickness of about 60 μm. The polymer sheet was fixed to the inner surface of the pouch casing material by using a Kapton double-sided tape.

2. Manufacture of Battery

A battery was obtained in the same manner as described in the Example, except that the pouch casing of Comparative Example 1, part 1 was used.

Comparative Example 2

A battery was obtained in the same manner as described in the Example, except that the pouch casing without the polymer sheet was used.

Determination of HF Scavenging Capability

Each of the batteries according to the Example and Comparative Examples 1 and 2 was subjected to initial charging under the constant current-constant voltage (CC-CV) condition at 25° C. with a current density of 400 mAh, was allowed to stand for 10 minutes, and was discharged to 1.8V. This was repeated 100 times.

Then, the electrolyte was recovered from each battery and the manganese content was determined. The results are shown in the following Table 1.

TABLE 1

| Test | Example | Comp. Ex. 1 | Comp. Ex. 2 |
|---|---|---|---|
| Mn concentration (ppm) | 56 | 144 | 148 |

HF is generated during the charging/discharging of the battery and the generated HF causes dissolution of metal ions from the positive electrode active material. In the battery according to the Example, it is thought that the polymer sheet was dissolved and HF generated in the battery was scavenged by the HF scavenger introduced into the electrolyte to prevent Mn dissolution. In the battery according to Comparative Example 2, HF generated during the charge/discharge cycles was not removed due to the lack of the HF scavenger, resulting in a high amount of Mn dissolution as compared to the Example. In addition, in the battery according to Comparative Example 1, it is thought that the polymer sheet is not dissolved in the electrolyte and the HF scavenger contained in the polymer sheet cannot be dissolved out to the electrolyte, thereby providing a Mn content in the electrolyte similar to that of Comparative Example 2.

The present disclosure has been described in detail with reference to embodiments and drawings, but the present disclosure is not limited thereto. It should be understood that various changes and modifications within the scope of the disclosure will become apparent to those skilled in the art from this detailed description.

What is claimed is:

1. A casing for containing an electrode assembly, comprising:
a casing material which is arranged such that an inner surface of the casing material defines
a receiving portion corresponding to the shape of an electrode assembly; and a polymer sheet disposed on the inner surface of the casing material,
wherein the polymer sheet having a hydrogen fluoride (HF) scavenger contained therein or disposed on a surface thereof, and
wherein the polymer sheet is capable of dissolving at pH of 3 or less,
wherein the casing material comprises a laminate sheet, wherein the laminate sheet having, in order, an outer coating layer of a polymer film, a barrier layer of metal foil, and an inner sealant layer of polyolefin, and wherein the inner sealant layer faces the receiving portion, and
wherein the polymer sheet comprises a polymer containing at least one of repeating units represented by Chemical Formula 1, Chemical Formula 2 or Chemical Formula 3:

[Chemical Formula 1]

[Chemical Formula 2]

[Chemical Formula 3]

wherein each X in Chemical Formula 1 and Chemical Formula 2 is, independently, a single bond, a sulfone group, ether group, thioether group or a C1-C5 alkyl group; and Y in Chemical Formula 2 is a single bond, a sulfone group, ether group, thioether group or a C1-C5 alkyl group.

2. The casing according to claim 1, wherein the HF scavenger is contained in the polymer sheet.

3. The casing according to claim 1, wherein the HF scavenger is coated on one surface of the polymer sheet.

4. The casing according to claim 3, wherein the one surface of the polymer sheet faces the inner surface of the casing material.

5. The casing according to claim 1, wherein the HF scavenger is at least one selected from the group consisting of lithium cobalt oxide, lithium carbonate ($Li_2CO_3$), sodium carbonate, calcium hydroxide, activated carbon, diatomaceous earth, perlite and zeolite.

6. The casing according to claim 1, wherein the HF scavenger is present in an amount of 0.01-50 wt % based on the total weight of the polymer sheet.

7. The casing according to claim 1, wherein the polymer sheet further comprises a binding assistant to increase the binding force of the HF scavenger to the polymer sheet.

8. The casing according to claim 1, wherein the polymer sheet is coupled to the inner surface of the casing material by a non-reactive adhesive or fused to the inner surface of the casing material.

9. The casing according to claim 8, wherein the non-reactive adhesive is a silicone polymer adhesive or a carbon optical fiber polymer adhesive.

10. The casing according to claim 1, wherein the polymer sheet is disposed on a surface of the inner sealant layer.

11. A secondary battery comprising the casing of claim 1.

12. The secondary battery according to claim 11, further comprising:
   an electrode assembly disposed in the receiving portion.

13. A secondary battery comprising:
   an electrode assembly comprising a positive electrode, a negative electrode and a separator interposed between the positive electrode and the negative electrode;
   an electrolyte containing a lithium salt and an organic solvent; and
   the casing of claim 1,
   wherein the electrode assembly and the electrolyte are disposed in the receiving portion of the casing.

* * * * *